United States Patent [19]

Vitello

[11] Patent Number: 5,719,474

[45] Date of Patent: Feb. 17, 1998

[54] FLUORESCENT LAMPS WITH CURRENT-MODE DRIVER CONTROL

[75] Inventor: Robert J. Vitello, Duluth, Ga.

[73] Assignee: Loral Corporation, New York, N.Y.

[21] Appl. No.: 663,893

[22] Filed: Jun. 14, 1996

[51] Int. Cl.$^6$ ................................................. H05B 37/02
[52] U.S. Cl. ........................ 315/307; 315/224; 315/DIG. 4
[58] Field of Search ................................ 315/307, 308, 315/224, 291, DIG. 4, DIG. 5, 226, 209 R, 219

[56] References Cited

U.S. PATENT DOCUMENTS

| | | | |
|---|---|---|---|
| 5,428,265 | 6/1995 | Booth, Jr. et al. | 315/154 |
| 5,481,163 | 1/1996 | Nakamura et al. | 315/308 |

*Primary Examiner*—Robert Pascal
*Assistant Examiner*—David Vu
*Attorney, Agent, or Firm*—Perman & Green, LLP

[57] ABSTRACT

A system wherein light from a fluorescent lamp is dimmed by modulating the pulse-width of current pulses. A current-command signal is applied to a lamp driver in response to a voltage-level corresponding to a given, selectable level of desired lamp brightness. The lamp driver operates as a flyback AC power source that advantageously uses a FET switch to decouple the lamp and a resonant bridge, with the current-sampling process. The circuit samples only the inductor current while the FET switch is active. Because the sample is decoupled from the lamp and bridge, this sampling provides particularly tight control of the regulation process needed to control the incoming noise and transients that affect the power supplied to the lamps. The lamp driver a can also operate as a synchronously-driven resonant forward converter that senses the current actually supplied to the lamp and responds to changes in the fluorescent lamp's condition since the lamp is coupled to the circuit.

7 Claims, 6 Drawing Sheets

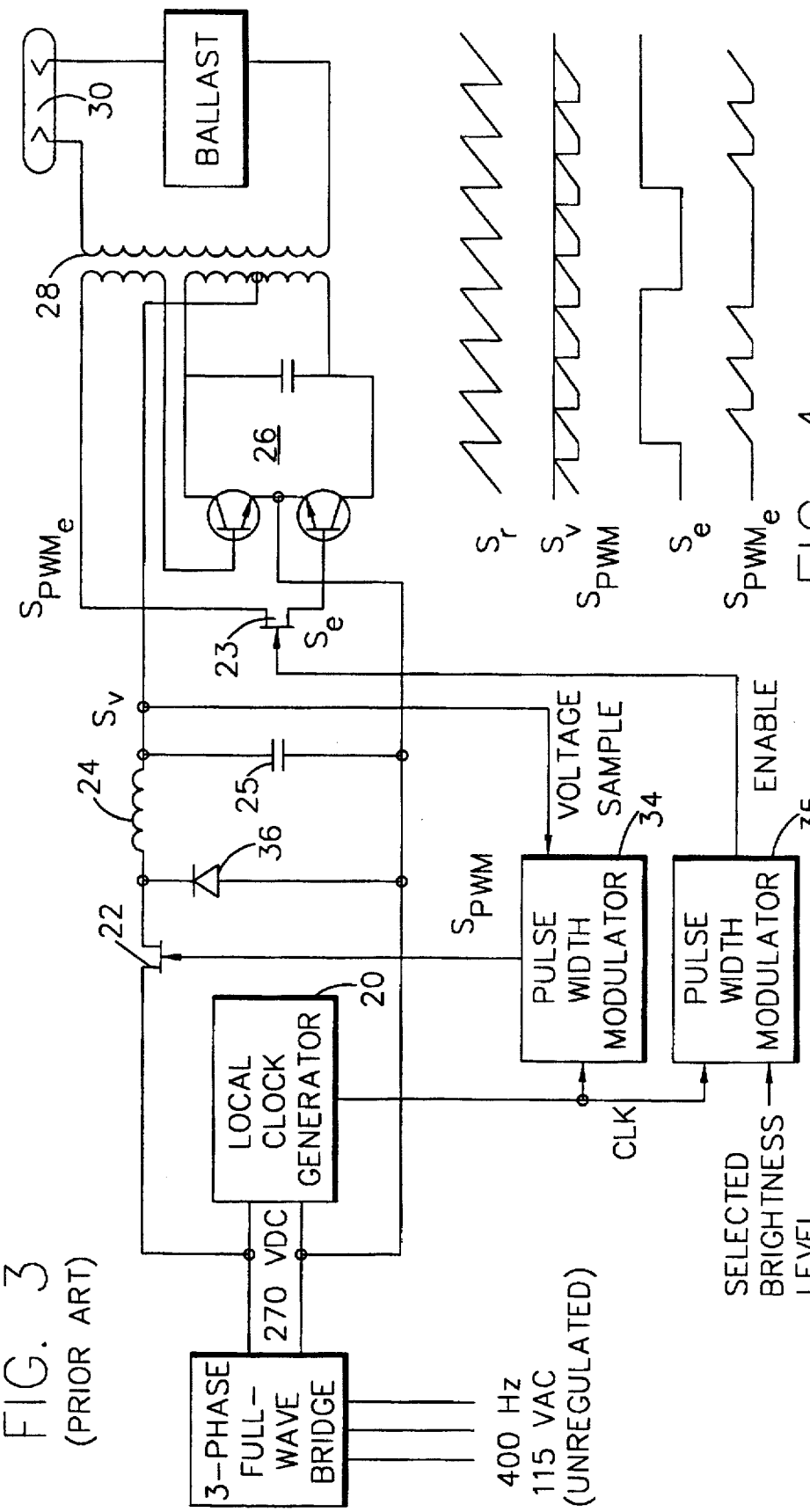

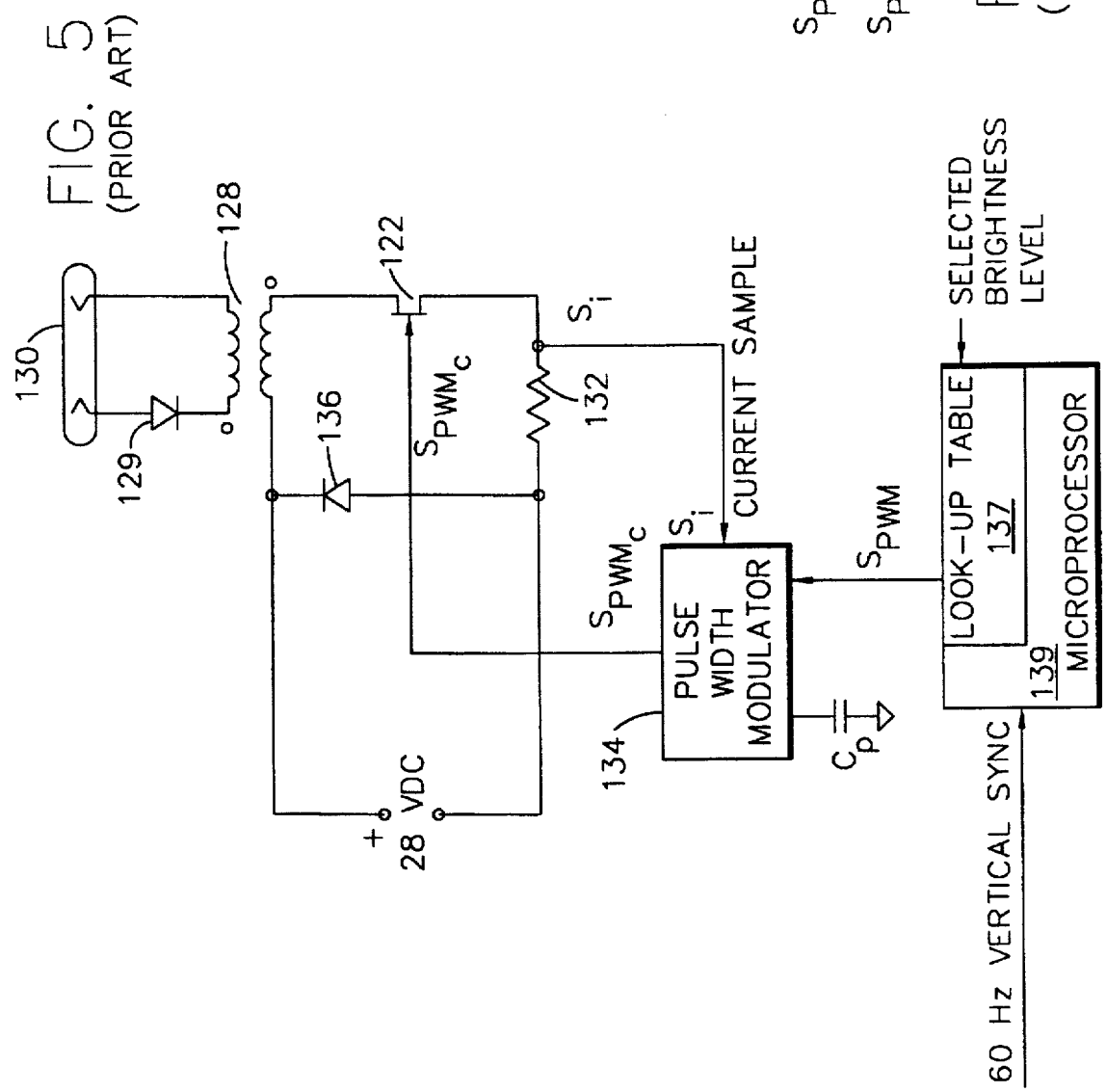

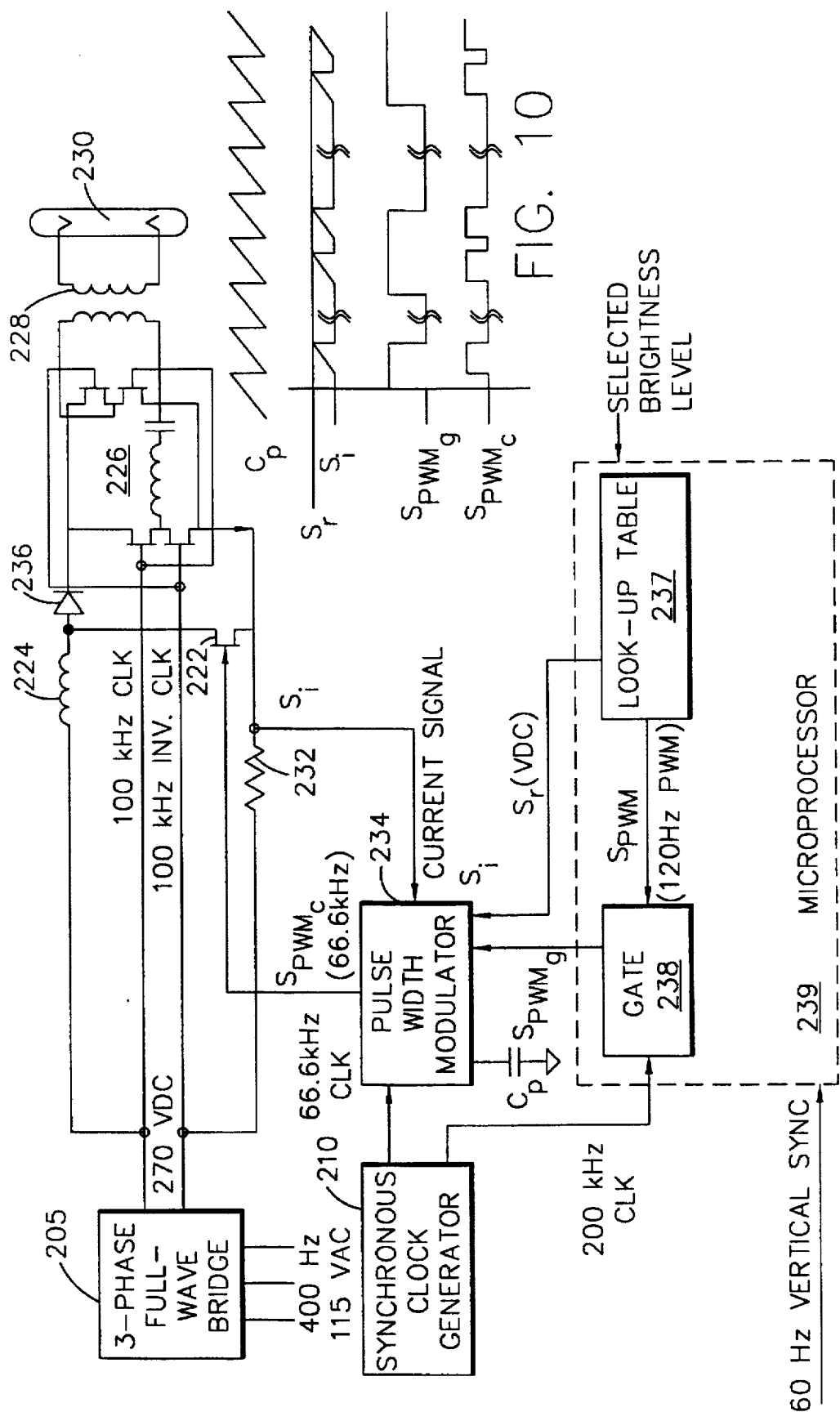

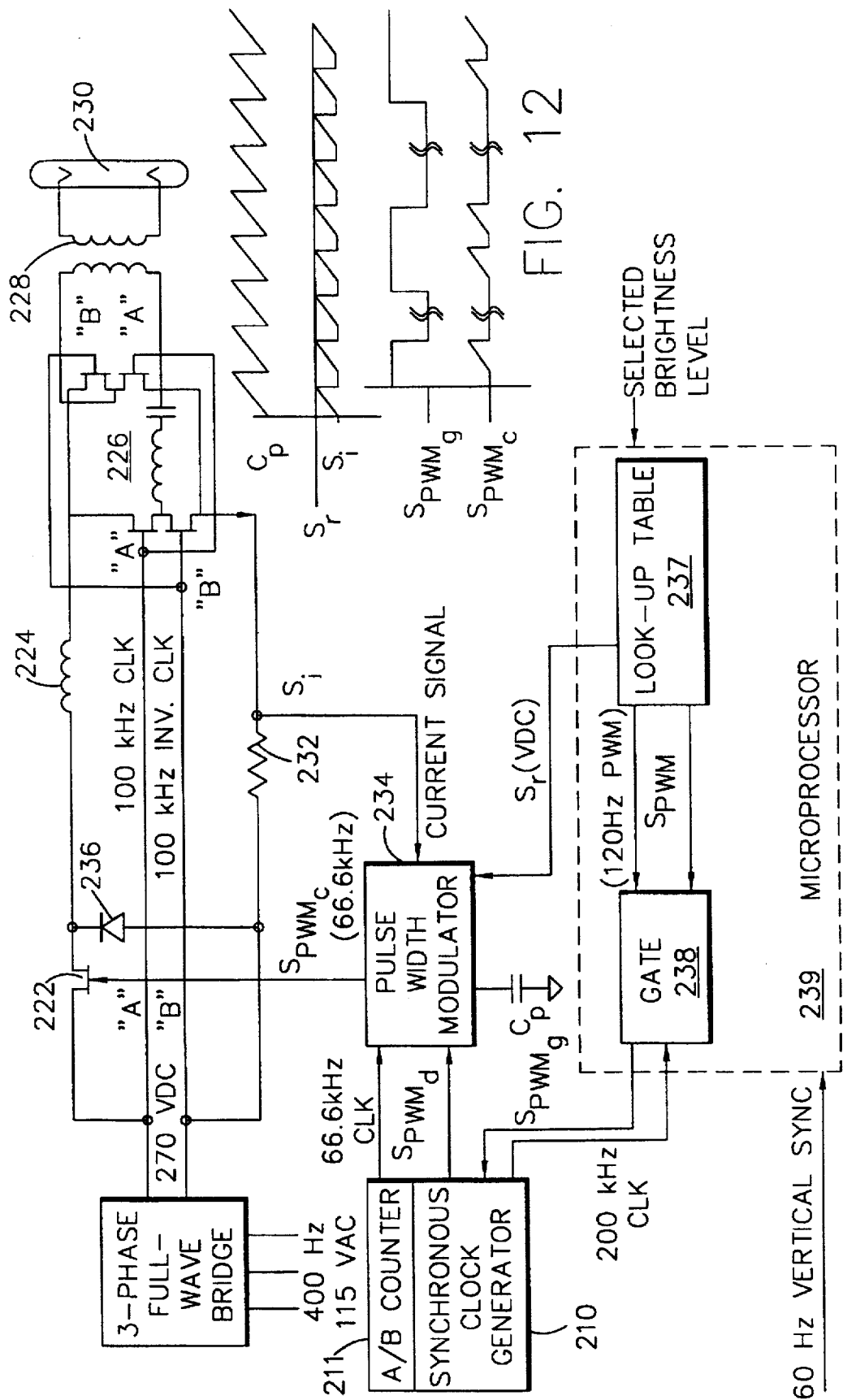

FLUORESCENT LAMPS WITH CURRENT-MODE DRIVER CONTROL

BACKGROUND OF THE INVENTION

1. Field of the Invention

The present invention pertains to fluorescent lighting, and more particularly, to dimmer-control circuits for controlling the light level provided by fluorescent lamps.

2. Discussion of Related Art

Processor-controlled fluorescent lamp dimmer circuits are known in the art. In U.S. Pat. No. 5,428,265 issued Jun. 27, 1995 to Booth, Jr. et al., entitled: "PROCESSOR CONTROLLED FLUORESCENT LAMP DIMMER FOR AIRCRAFT LIQUID CRYSTAL DISPLAY INSTRUMENTS" discloses a processor controlled fluorescent lamp dimmer circuit for use in an aircraft display system utilizing a fluorescent lamp in the backlight system of individual liquid crystal display (LCD) devices. By use of a processor control dimming circuit in control over each LCD display, greater flexibility, e.g., as by adjustment in software parameters, is made possible in the operation of a dimmer control circuit. The dimmer control circuit reacts to such conditions as ambient light within the aircraft cockpit, fluorescent lamp light energy output, and fluorescent lamp temperature to provide substantially consistent actual and perceived luminance on the LCD display as a function of such detected conditions. Furthermore, the processor control achieves the desired luminance without over-driving, and therefore deteriorating, the lamps. As a result, the pilot of the aircraft enjoys a more reliable and consistent LCD display and need not be distracted by variation in luminance of the LCD display in operation of the aircraft.

A look-up table is used to determine the actual brightness level necessary to maintain a given apparent luminance level. The look-up table value conventionally corresponds to a voltage value that should provide suitable backlight illumination for the LCD displays, given the existing light and temperature conditions, the condition of the lamps and applicable night-vision (NVIS) restrictions, and also protect the lamps from excessive wear and damage, all things being equal.

Lamps for the backlighting large "view-screen"-type LCD avionics display panels where a correct and stable illumination level is extremely important, operate in an environment that is both physically and electronically hostile. The power available to be supplied to the lamps is unregulated, spike-prone 400 Hz generator power, further complicated by the high ambient levels if switching noise and navigational and communications rf emissions in an airplane's cockpit. The displays must also perform in extremes of temperature, humidity and vibration.

The characteristic impedance of a fluorescent lamp varies with the current applied to drive it. For a given voltage and a given physical operational state, the lamps can operate at any one of several possible current levels that provide different levels of illumination. Despite this, lamp-control circuits for fluorescent lamps have commonly used voltage sensing for luminance-control feedback. FIGS. 1, 2, 3 and 4 show several known fluorescent lamp driver circuits that provide varying degrees of luminance control for such lamps.

FIGS. 1 and 2 show a typical pulse width modulation dimmer circuit and the related circuit waveforms. In FIG. 3, the circuit of FIG. 1 is modified to control the unregulated rectified 3-phase power supplied to LCD displays in military aircraft. In FIG. 3 and the waveforms of FIG. 4, the voltage-sensing dimmers' luminance range is limited, because voltage-regulation cannot assure stable fluorescent-lamp operation at low-luminance levels.

Pulsed-energy fluorescent lamp driver circuits that use current-sensing are known, an example of such circuit and waveforms are shown in FIGS. 5 and 6. However, using pulsed DC, rather than more balanced, AC power to drive a fluorescent lamp, causes mercury pumping toward the lamp's cathode.

In small-bore fluorescent lamps that are used for the smaller avionics display panels, mercury pumping is a particularly serious problem.

On the other hand, the broader channels of the flat, panel-like fluorescent lamp elements used for backlighting large LCD display panels are difficult to light evenly. The lighted arc inside the channels tends to migrate with changes in the polarity of the signal provided to the lamp, so that the arc visibly moves to one side of the channel when the polarity of the drive energy is unbalanced. Thus, balanced drive energy is also important for more stable, more even illumination.

Current-mode pulse-width modulation (PWM) has been used for voltage regulation in power-supply circuits, as illustrated in the circuit of FIG. 7 and the waveforms of FIG. 8. However, in those power supplies, a current sample is used to anticipate the changes in output voltage that must be compensated by the power supply. Thus, the current-sensing input in this control circuit "tightens" the accuracy of voltage-regulation by the power supply by introducing information about the state of the input line to the regulation equation. This assures that disruptive events are quickly countered, so that the output voltage remains stable.

Power supplies using feed-forward current sensing regulate their output voltage by comparing that output voltage to a reference voltage, as shown in FIG. 8. The error between the desired and actual output voltage then pulse-width modulates a pulsed current-sampling signal. This corrects the output voltage of the power supply voltage, rather than regulating the current provided by the power supply.

Line regulation that senses the amount of current supplied to a fluorescent lamp, rather than the voltage level supplied to the lamp, assures continuity in desired changes in luminance levels made in response to changing ambient light levels, and steady illumination. This is particularly important in avionic applications for providing an accurate, noise-free presentation of critical flight information to the pilot as the unregulated voltage supplied to the LCD displays by an airplane's generating equipment varies.

On the other hand, circuits for voltage-mode control of AC circuits are usually simpler to construct and easier to maintain than current-mode control circuits in most applications. In particular, the voltage-sensing signals are clean, easy-to-manipulate waveforms taken from the filtered output of the control circuit. Current-sensing signals, however, reflect parasitics, switching transients and other noise internal to dynamic circuit operations. Thus, voltage-mode control has been customarily used for fluorescent lamp drivers.

However, because of the combined need for highly-effective line regulation, and reduced noise imaging by the display panels and very stable, wide-range fluorescent-lamp drivers for the avionics environment, the current-mode AC control previously used to fine-tune voltage-sensed output voltage control in AC power-supply art is advantageous as the sole feed-back mode for an AC fluorescent lamp driver.

SUMMARY OF THE INVENTION

An object of the present invention is to provide a fluorescent lamp circuit using current mode sensing where light from a fluorescent lamp is dimmed by modulating the pulse-width of a pulsed, current-sampling signal in response to a voltage-level corresponding to a given, selectable level of desired lamp brightness.

Another object of the present invention is to provide a fluorescent lamp driver circuit using current mode sensing that operates as a flyback AC power source that advantageously decouples the lamp and resonant bridge, with their high-level of parasitic capacitance and noise, from the current-sampling process. A further object of the present invention is to provide a fluorescent lamp driver circuit that samples a flyback current while an FET in the circuit is on. Because the current sampling provides particularly tight control of the regulation process needed to control the incoming noise and transients that affect the power supplied to the lamps by the aircraft's generator.

A further object of the present invention is to provide a fluorescent lamp driver circuit that operates as a synchronously-driven resonant converter, and senses the current actually supplied to the lamp. This provides looser regulation of changes in incoming line, but responds to changes in the fluorescent lamp's condition since, here, the current is sensed while the lamp is coupled to the circuit.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

A fluorescent lamp control circuit in accordance with a first embodiment of the invention comprises a fluorescent-lamp driver having an inductance in series with a first winding of a transformer and an FET switch in parallel to said first winding of the transformer. In a second embodiment the FET switch and the inductance are both in series with a first winding of a transformer.

In each of these circuits, the lamp is connected to a second winding of the transformer and power is supplied to the first winding through a resonant-bridge AC converter circuit. A current-sensing resistor is provided on the opposite side of the transformer from said inductance, and the current sample signal from the load end of that resistor is pulse-width modulated by a DC-voltage signal corresponding to a desired brightness level. Also, a pulsed signal having a pulse width that is determined by said desired brightness level gates the modulated current sample signal into bursts.

In a particular embodiment, synchronizing the operation of the FET switch with the driving frequency of the bridge assures that bridge switching does not occur during a pulse, so that each pulse is provided to one side of the bridge or the other. Synchronizing the microprocessor to a harmonic of the driving frequency of the bridge and a leading edge of the clock frequency of the pulse-width modulator prevents the addition of spurious frequencies to the noise spectrum produced by the driver so that only narrow bands of noise are produced at the respective clock frequencies and the integrity of the image on the LCD display can be protected by simply filtering the respective fundamental clock frequencies.

Synchronizing the microprocessor's pulsed brightness-control signal to the vertical sync rate signal of the display panel assures that any such noise emitted by the lamp driver circuit that is picked up by the display, will appear in the display as merely a stationary blip, rather than a much more distracting "moving target" image.

In accordance with a further particular embodiment, the pulses gating the burst signal that controls said switch are selectively delayed by the synchronous pulse generator so that successive pulses are switched by opposite sides of the bridge. This prevents the lamp from receiving consecutive pulses of the same polarity, so that the energy driving the lamp is balanced and the arc remains stable.

This strict alternation of energy bursts also permits the establishment of twin arcs that produce an apparent lateral widening of the lighted arc inside the channel of the fluorescent lamp. The effect of this apparent lateral spreading of the light in the channels is particularly advantageous for the larger, rectangular, flat fluorescent lamps that have relatively wide channels and difficulty in evenly illuminating the surface of the lamp between those channels.

BRIEF DESCRIPTION OF THE DRAWINGS

The features and advantages of this invention will be better understood when the detailed description of a preferred embodiment provided below is considered in conjunction, with the drawing provided, wherein:

FIGS. 1, 2, 3, 4, 5, 6, 7 and 8 are diagrams of prior art lamp-control and power-supply circuits with associated waveforms.

FIGS. 9, 10, 11 and 12 are circuit and waveform diagrams of embodiments of current-mode fluorescent-lamp dimmer circuits in accordance with the principles of the present invention.

DETAILED DESCRIPTION OF THE PREFERRED EMBODIMENTS

Figure 1:
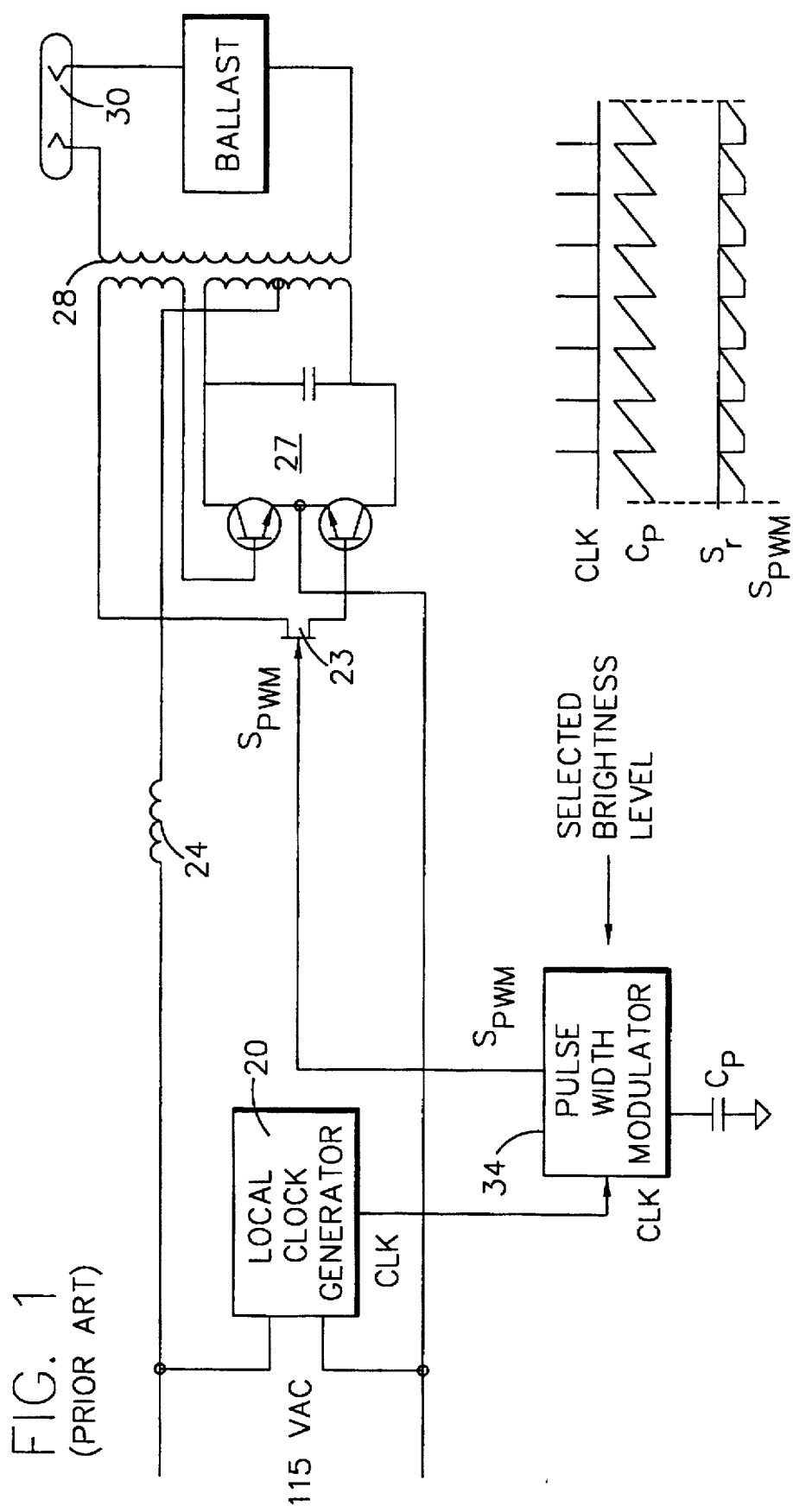
Figure 2:
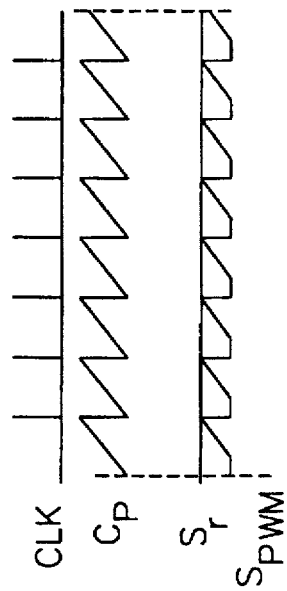
Figure 7:
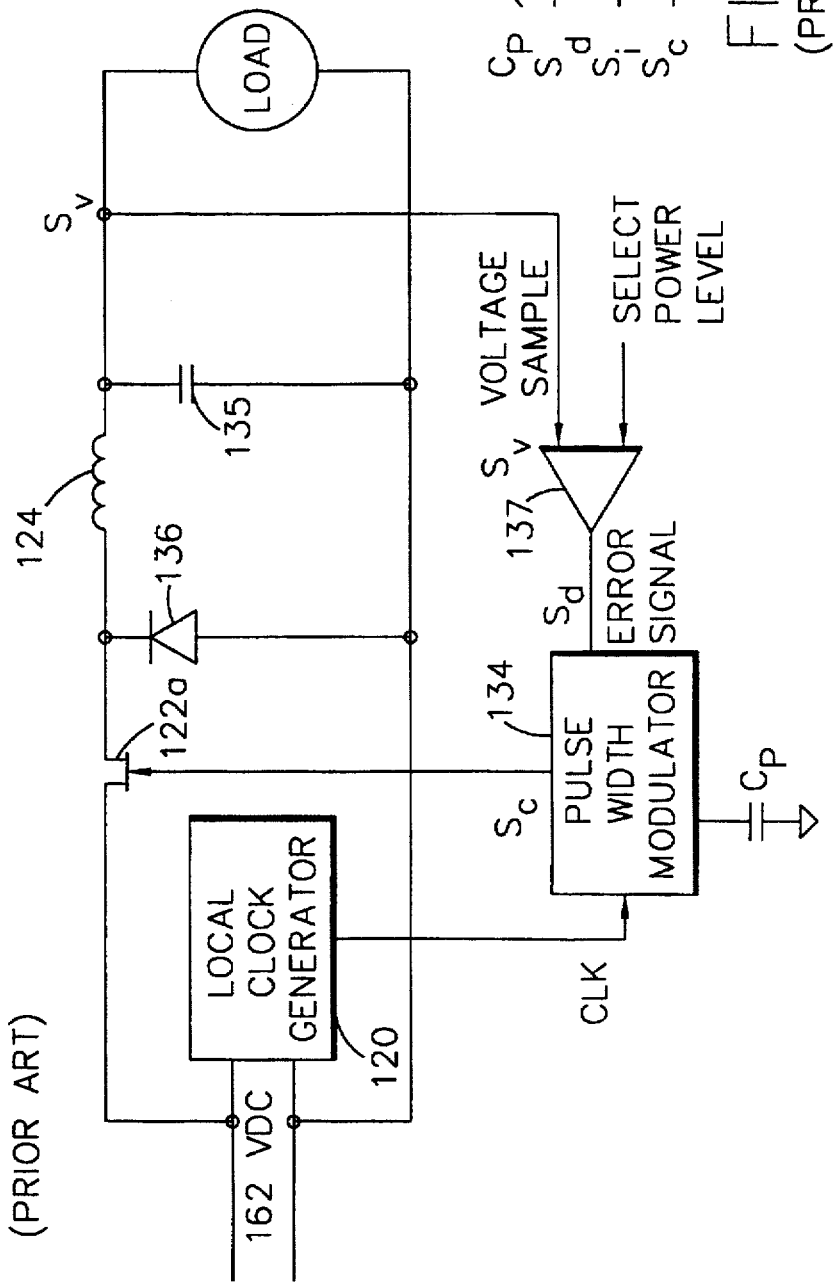
Figure 8:
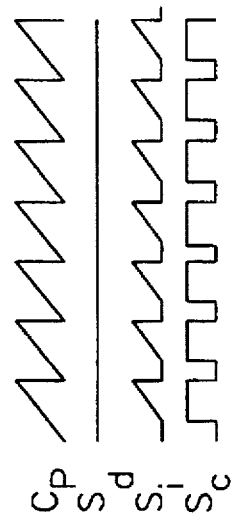

FIG. 9 shows a first fluorescent-lamp driver circuit using current mode sensing in accordance with the present invention. This circuit is designed for tightly controlling large, backlighted LCD avionics display panels that are driven by unregulated, very noisy, rectified 3-phase power. In accordance with Mil-Std-704, the unregulated, 115 VAC 3-phase power is rectified by a full-wave bridge 205. The rectified voltage from bridge 205 is supplied through a series inductor 224 to one side of a 100 kHz resonant-bridge transformer driver device 226 connected to the primary winding of the output transformer 228. The output transformer 228 provides regulated AC current to drive the fluorescent lamp 230 connected to its secondary winding.

The return line from bridge 205 is connected through a sense resistor 232 to the other side of resonant bridge driver device 226. The other side of the primary winding of the output transformer 228 is connected to the sense resistor 232, through an FET 222 switched at a rate 66.6 kHz by the output of a pulse-width modulator 234. A ramped-voltage current-sense signal is detected between the FET 222 and the sense resistor 232, and supplied to the pulse-width modulator 234.

Each side of the resonant-bridge driver device 226 that feeds the transformer 228 is driven by a respective 100 kHz clock signal from generator 210 synchronized to the leading edge of the 66.6 kHz pulse that drives the pulse-width modulator 234. The pulse-width modulator 234 reduces the pulse width of the current signal $S_i$ provided by sense resistor 232 in response to the brightness reference signal $S_r$. This signal $S_r$ is a DC voltage level determined by a "SELECTED BRIGHTNESS LEVEL" signal input to the microprocessor 239, which can be any suitable representation of a brightness level selected by the user.

The voltage level of that reference voltage $S_r$ and the pulse-width 120 Hz brightness command reference pulse $S_{PWM}$ that is synchronized to the LCD display's 60 Hz vertical sync signal both correspond to the respective signal values given in a lookup table 237 in the microprocessor 239 for the "SELECTED BRIGHTNESS LEVEL" signal input to the lamp driver's microprocessor by the user most recently. The lookup table may also factor in environmental and component-performance information in determining the two dimmer signals $S_r$ and $S_{PWM}$ that are output by the microprocessor 239.

The width of the 120 Hz width-modulated brightness signal $S_{PWM}$ determined by the lookup table is supplied to the pulse-width modulator 234 through a synchronizing gate 238 driven by a 200 kHz synchronous clock signal from the synchronous clock generator 210. The pulse-width modulator 234 is driven by a 66.6 kHz synchronous clock signal to output the 66.6 kHz current regulation signal $S_{PWMc}$ as an energy-burst signal that is gated by the synchronously-gated 120 Hz brightness-level signal $S_{PWMg}$. The pulse-width modulator 234 uses $S_{PWMg}$ to produce width-modulated 120 Hz dimmer-bursts made up of 66.6 kHz current-conductive sense pulses $S_i$ that are width-modulated by the reference voltage $S_r$. The regulated power passed from the 3-phase full-wave bridge when the FET switch 222 is rendered conductive by the power-control signal $S_{PWMc}$ is then converted to the AC power needed for efficiently operating the fluorescent lamp 230 by the resonant bridge 226 and step-up transformer 238 in a manner well-known in the art. The LC branch of this bridge 226 serves as an AC-coupled ballast for the lamp 230.

In FIG. 9, the output side of the inductor 224 is connected to a diode 236 that provides the necessary path for the fly-back pulse of the inductor 224 when the FET switch 222 is off. The FET switch 222 momentarily shorts-out the converter section of the resonant bridge circuit 236. Therefore the fly-back pulse is not loaded down with the parasitic capacitances of the bridge, transformer and lamp, and the feed-forward effect of current-mode power regulation is maximized. This assures fast response to the very fast, large, transient disturbances often found in the unregulated 270 Hz DC used by this avionics circuit, as well as to ripple and to load fluctuations external this circuit, disturbances that affect it because the line voltage supplied to it is both rectified and unregulated.

In contrast, in FIG. 11 wherein the synchronous clock generator 210 includes an A/B counter 211, the FET switch 222 is located between the inductor 224 and the line input, so that the inductor 224 cannot charge while the FET switch 222 is cut off. In this second circuit, the inductor 224 cannot build a field while the FET switch is cut off. Thus the diode 236 merely "freewheels", protecting other circuit elements from being damaged by the inductor's decaying field.

Also, in FIG. 11 the gated pulse $S_{PWMg}$ is first supplied to the clock generator 210, which then forwards a selectively-delayed copy of that signal $S_{PWMd}$ to the pulse-width modulator 134. To maintain polarity balance in the energy supplied to the step-up transformer 228 and, thereby, to accurately simulate AC operating conditions for the fluorescent lamp 230. The A/B counter 211 of clock generator 210 keeps track of the polarity of the 100 kHz clock pulse that gated the previous burst of the power-control signal $S_{PWMc}$ and, if necessary, delays the next burst of that power-control signal $S_{PWMc}$ until a 100 kHz clock pulse of the correct polarity is available. In flat lamps having sufficiently wide fluorescent channels, the "synthetic" energy balance provided by this feature of the current-mode AC lamp driver also produces an apparently "widened" or "dual" lighted arc within the channel that improves light distribution across the surface of these lamps, as well as stabilizing the arc's position.

The lamp dimmer of FIG. 9 operates as a fly-back AC lamp driver that advantageously decouples the lamp and resonant bridge, with their high levels of parasitic capacitance and noise, from the current-sampling process, for providing particularly tight control of the regulation process controlling the incoming noise and transients while the FET switch 222 is in a non-conductive state.

The lamp dimmer of FIG. 11 operates as a resonant converter that senses the current actually supplied to the lamp's step-up transformer 238. Thus it has a signal directly reflecting operational impedances that indicate the lamp's condition, rather than just fluctuations in the incoming line voltage supplied by the 3-phase line rectifier. On the other hand, because of the parasitic capacitances coupled to the current sensing function in this circuit, less lead-time is provided for making corrective responses to disturbances occurring on the 3-phase line.

The invention has been described with particular reference to a presently preferred embodiment thereof, but it will be apparent to one skilled in the art that variations and modifications are possible within the spirit and scope of this invention. The invention is defined by the claims appended below.

I claim:

1. A lamp driver circuit for current mode control of the light intensity of a fluorescent lamp comprising:

a fluorescent lamp, a transformer having a primary winding and a secondary winding, said secondary winding being connected to said fluorescent lamp, a resonant bridge transformer driver circuit having a first side and a second side, said second side being connected across said primary winding of said transformer, a series inductance means connected between the first side of said resonant bridge transformer driver circuit and a source of input power signal, a current sensing resistance means connected between the first side of said resonant bridge transformer driver circuit and said source of input power signal, a switching means connected to said series inductance means and said first side of said resonant bridge transformer driver circuit, a pulse-width modulator means for producing a pulse width modulated signal $S_{PWMc}$ that is connected to said switching means to alternately open and close said switching means at a frequency representative of said pulse-width of said pulse-width signals, said opening and closing of said switching means causing the field of said series inductance means to fluctuate, a synchronous clock generator means connected to said pulse-width modulator means to provide a synchronous clock signal, a signal tap connecting said current sensing resistance to said pulse-width modulator to provide a current-sense signal $S_i$ to said pulse width modulator means, a processor means for providing a brightness level reference signal $S_r$ and a current regulation signal $S_{PWMg}$, said processor means being connected to a selected brightness level signal and to a clock signal from said synchronous clock generator means, said pulse-width modulator means being connected to said processor means and responsive to said $S_r$ signal therefrom and to said $S_i$ signal from said signal tap to width modulate said $S_i$ signal by said $S_r$ signal to produce said $S_{PWMc}$ pulse-width modulated signal connected to said switching means.

2. A lamp driver circuit according to claim 1 wherein said switching means is an FET device connected in parallel with said inductance means and also connected to said current sensing resistance means and said second side of said resonant bridge transformers circuit.

3. A lamp driver circuit according to claim 1 wherein said pulse-width modulator means is connected to said $S_{PWMg}$ signal from said processor means.

4. A lamp driver circuit according to claim 3 wherein said pulse-width modulator means is connected to a DC signal $S_r$ corresponding to a desired brightness level for said fluorescent lamp.

5. A lamp driver circuit according to claim 4 wherein said $S_{PWMg}$ being connected to said pulse-width modulator means to gate said $S_i$ signal into signal bursts to provide said $S_{PWMc}$ signal to control said switching means.

6. A lamp driver circuit according to claim 1 wherein said switching means is an FET device connected in series between said inductance means and said source of input power signal.

7. A lamp driver circuit according to claim 1 wherein said synchronous clock generator means includes an A/B counter to keep track of the polarity of the synchronous clock signal and is connected to said $S_{PWMg}$ current regulation signal from said processor means.

* * * * *